June 10, 1924.
L. PRZEDECKI
1,497,026
APPARATUS FOR PREPARING CIGARETTE MOUTHPIECES
Filed May 14, 1923   2 Sheets-Sheet 1
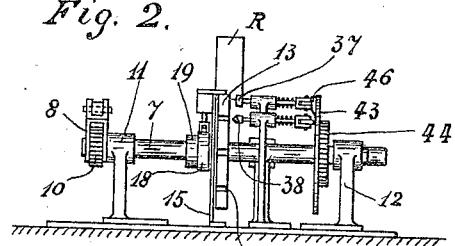
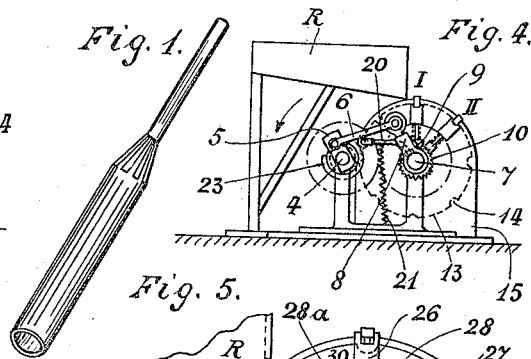
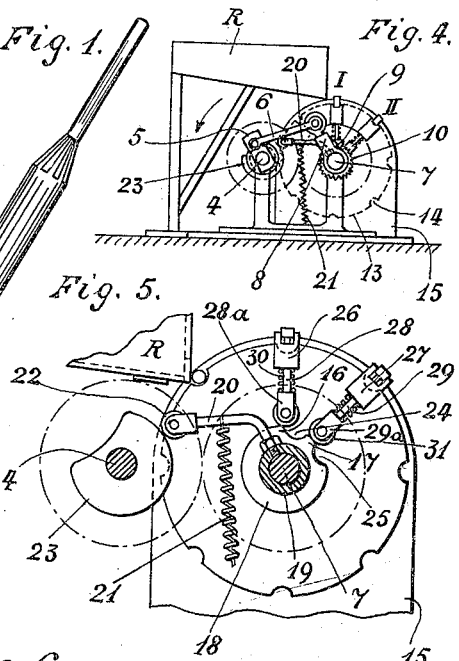
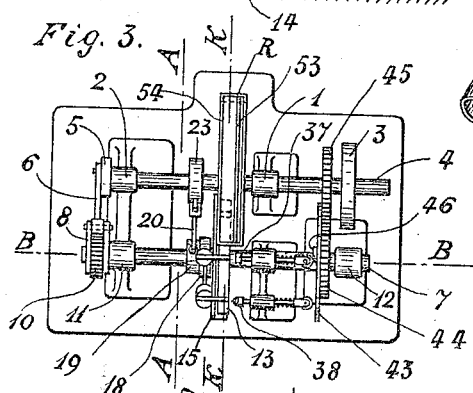
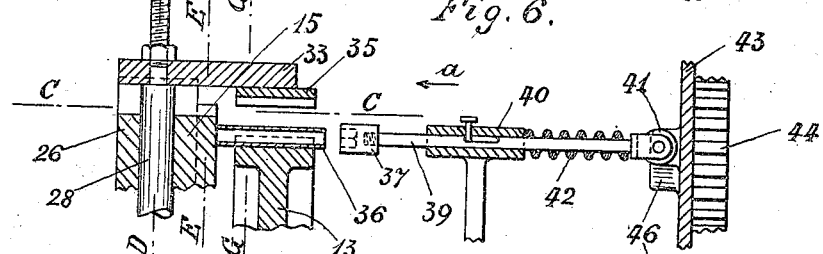
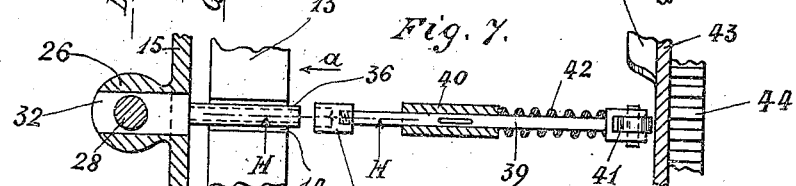
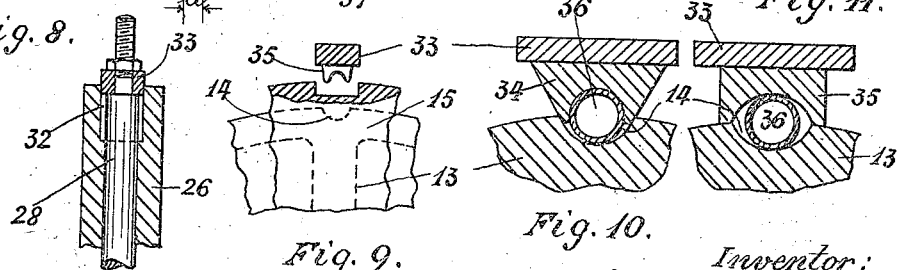
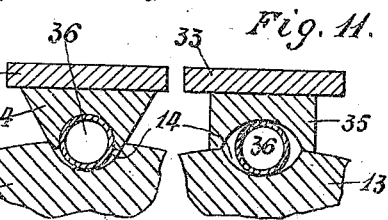
Inventor:
Ludwig Przedecki
by C. Jewes
his attorney.

June 10, 1924.                                                          1,497,026
L. PRZEDECKI
APPARATUS FOR PREPARING CIGARETTE MOUTHPIECES
Filed May 14, 1923                                   2 Sheets-Sheet 2

Inventor:
Ludwig Przedecki
by C. Tuves
his attorney.

Patented June 10, 1924.

1,497,026

UNITED STATES PATENT OFFICE.

LUDWIG PRZEDECKI, OF BRESLAU, GERMANY.

APPARATUS FOR PREPARING CIGARETTE MOUTHPIECES.

Application filed May 14, 1923. Serial No. 638,910.

*To all whom it may concern:*

Be it known that I, LUDWIG PRZEDECKI, a citizen of the Republic of Germany, and a resident of Breslau, Germany, have invented certain new and useful Improvements in Apparatus for Preparing Cigarette Mouthpieces, of which the following is a specification.

It has been previously proposed to provide cigarettes with mouthpieces in the form of straw-tubes or reeds and the like, in such a manner, that the end of the mouthpiece to be secured to the cigarette is slit into a number of strips of a certain length, these strips thereafter being spread outwardly and then bent over one end of the cigarette in order finally to be gummed thereon.

The apparatus hitherto known and employed for the preparation of such cigarette mouthpieces essentially consists of a series of slitting knives for slitting one end of the mouthpiece, and of a clamp for compressing and bending the slitted mouthpiece end. The star-shaped or parallelly disposed knives are hereby securely mounted on a bed-plate. For the purpose of slitting the tubular mouthpiece, the latter is vertically pressed down on the knives, the end of the tube thus being formed into a number of strips of a length corresponding with the height of the knives. The slit end is then inserted into the aforesaid clamp and thereby held and pressed flat, the free portion of the tubular mouthpiece being adapted to be bent over towards either side. In this way the slit and weakened strips will readily bend off or spread out without danger of the slits extending beyond the intended depth. The slitting and bending of the tubes as well as the spreading out of the strips require, however, separate manipulations, the preparation of the mouthpieces therefore being complicated and slow and unequal.

It is the object of this invention to avoid these drawbacks, the new and improved apparatus operating automatically and slitting the mouthpiece, for instance a straw-tube, and spreading out the slit strips without necessitating their previous bending off.

According to my invention the apparatus comprises a holder for the straw-tubes, this holder being adapted to rotate and having a number of recesses or grooves for the reception of the straw-tubes. The arrangement of the said holder is hereby such, that its rotary movement is intermittent and that it is successively arrested before a slitting-tool and a spreading-out cone respectively, both the slitting-tool and the cone during a stoppage of the holder being made to move axially of the straw-tubes resting in the grooves of the holder and slitting the tube and spreading out the slit strips in the manner subsequently set forth.

In the present case and by way of example the holder for the straw-tubes consists of a disc or drum provided at its circumference with a series of equidistant and laterally disposed grooves, each groove, as the drum is intermittently rotated by mechanism hereinafter described, serving to receive a straw-tube, while the aforementioned slitting-tool and the spreading-out cone are so mounted relative to the grooves, that upon each intermittent rotary movement of the drum one of the straw-tubes is slit and the preceding and previously slit straw-tube operated on by the cone, the operation consisting of the spreading out of the slit strips.

In order that the invention may be clearly understood reference is made to the accompanying drawings, in which:—

Fig. 1 shows a perspective view of a cigarette with a straw-tube mouthpiece attached thereto;

Figs. 2 to 4 represent a side elevation, plan view and front elevation, respectively, of the apparatus;

Figs. 5 and 6 show sections, on a larger scale, through lines A—A and B—B, respectively, in Fig. 3;

Figs. 7 to 9 are sections through lines C—C, D—D and E—E, respectively, in Fig. 6;

Figs. 10 and 11 are sections through lines G—G in Fig. 6, that is, through details indicated at I and II in Fig. 4;

Figure 12:
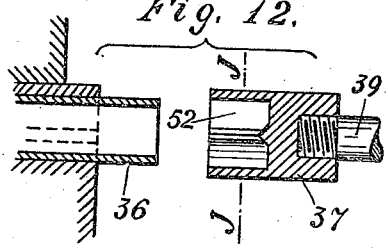
Fig. 12 shows a longitudinal section through the end of a straw-tube and of the slitting-tool, the section being taken through line H—H in Fig. 7.
Figure 13:
Fig. 13 is a section through line J—J in Fig. 12.

Referring first to Figs. 2 to 4, the apparatus comprises supports 1 and 2 with bearings for a shaft 4 adapted to be rotated by means of a pulley 3 fixed on the said shaft, the latter furthermore carrying a crank 5 which is capable of radial adjustment and of imparting a swinging motion to a lever-arm 8 loosely mounted on a second shaft 7 by means of a link 6 when the shaft 4 is rotated. A pawl 9 arranged on the lever-arm and engaging with a ratchet-wheel 10 on the shaft 4 causes the shaft 7 upon a swinging movement of the said arm in a right-hand direction to turn accordingly, while the lever-arm when made to swing in an opposite direction leaves the ratchet-wheel inactive and consequently the shaft 7 inactive. The latter is journaled in supports 11 and 12 and has securely mounted on it a disc or drum 13 provided at its circumference with a series of grooves 14, in the present case eight, all disposed at equal distances from one another, that is, at an angle of 45° relative to the centre of the drum. Thus, upon every complete rotation of the crank 5 the lever-arm 8 causes the shaft 7 and the drum 13 to be rotated about an angle of 45°. The shaft 7 extends through a fixed and vertically disposed plate 15 arranged close to one side of the drum 13, a disc 18 formed with two cams 16 and 17 being located at the other side of the said plate and loosely bearing on the shaft 7. This disc 18 is moreover provided with a hub 19, while the latter has attached to it an angle-shaped arm 20, Figs. 3 to 5. The free end of this arm 20 is under the control of a spring 21 and carries a roller 22, in such a manner, that the spring tends to press the roller against a cam 23 fixed on the shaft 4. The cam 23 is hereby so formed that when the shaft 4 is rotated the arm 20, by the action of the spring, is lowered into a depression of the cam and subsequently raised again, thereby causing an oscillating movement of the cam-disc 18. Owing to the cams 16 and 17 thereof and the adjacent depressions 24 and 25, Fig. 5, two radially disposed rods 28 and 29 are made to move outwardly and inwardly in relation to the centre of the disc 18, the said rods being placed at an angle of 45° to each other and carrying at their inner ends slidable and fork-shaped members 28ª and 29ª respectively. These members serve as bearings for rollers 31 and are each under the control of a spring 30 tending to press the members with rollers against the disc 18. The outer portion of the rods 28 and 29 extend through and are bearing in sleeves 26 and 27 respectively, which sleeves are secured to or made integral with the plate 15. The screw-threaded head of each rod receives a bar 33 which is fastened by a nut and reaches over the plate 15 and partly over the rim of the drum 13, the bar 33 moreover being in engagement with and guided by a recess 32 provided in the top of the aforementioned sleeves. Provision is further made of a clamping jaw 34 formed on the underside of one of the bars 33 and made of a width corresponding with the width of the drum 13, and of a second clamping jaw 35 of slightly different form on the underside of the other bar 33, Figs. 10 and 11. The jaws 34 and 35 are situated opposite two neighboring grooves 14 of the drum 13 and thus, when straw-tubes are placed into these grooves and the rods 28 and 29 are caused to be moved inwardly, the jaws are made partly to embrace the straw-tubes and securely hold them within the grooves. As will be seen later on, the straw-tube, after it has been placed directly under the jaw 34 during the rotary movement of the drum 13, will be slit, while upon a further rotary movement of the drum and the consequent placement of the straw-tube immediately beneath the jaw 35 its slit strips are caused to be spread out. And since during the slitting process a firmer grip of the straw-tube is required than is the case when merely spreading out the slit strips, the clamping jaw 34, contrary to the jaw 35, is made slightly to enter into the grooves 14.

As illustrated in Figs. 6 and 7, the plate 15 is mounted at a certain distance $d$ from the drum 13. This plate acts thus as a butment for the straw-tubes 36 when axial pressure is exerted thereon by the action of either the slitting-tool or the spreading-out cone as indicated by the arrow $a$. The plate 15 may, however, be adjusted and the distance $d$ varied according to the depth the straw-tubes are to be cut or slit.

Figure 14:
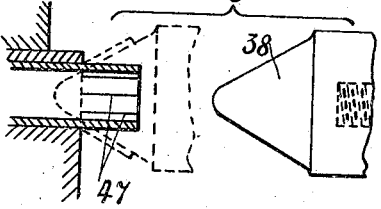
Fig. 14 represents a section longitudinally of a slit straw-tube, and an elevation of part of the spreading out cone.
Figure 15:
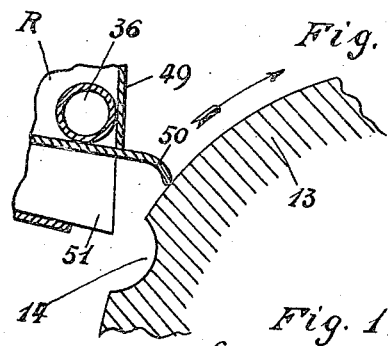
Figs. 15 and 16 show sections on an enlarged scale through line K—K in Fig. 3, with certain parts in different positions.
Figure 16:
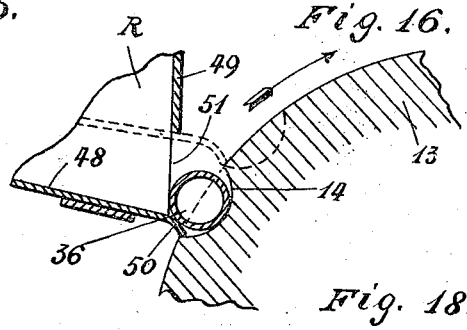
Figure 17:
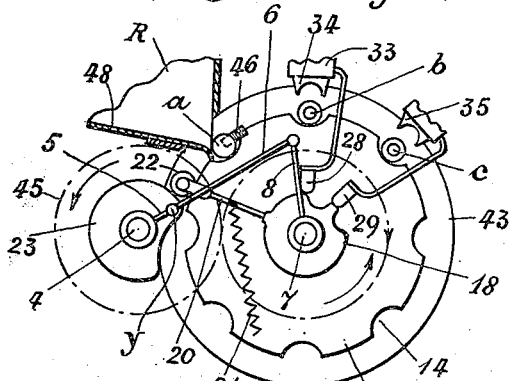
Figs. 17 to 20 show diagrammatical views to assist in the better explanation of the working of the apparatus.
Figure 18:
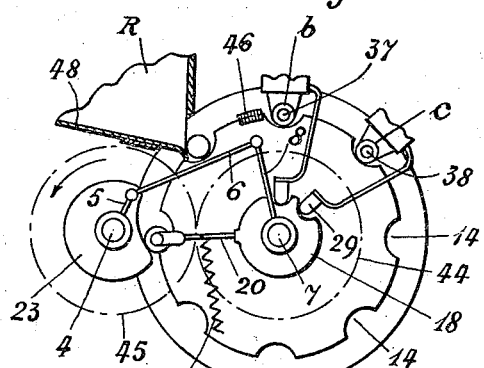
Figure 19:
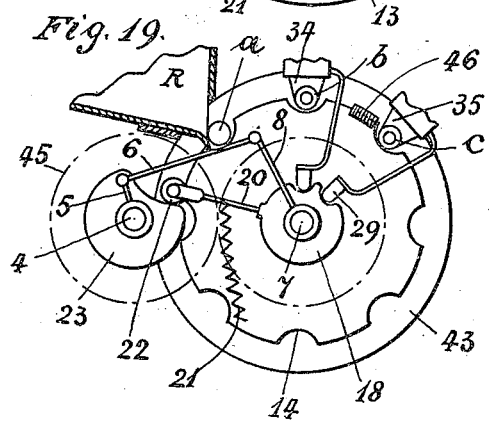
Figure 20:
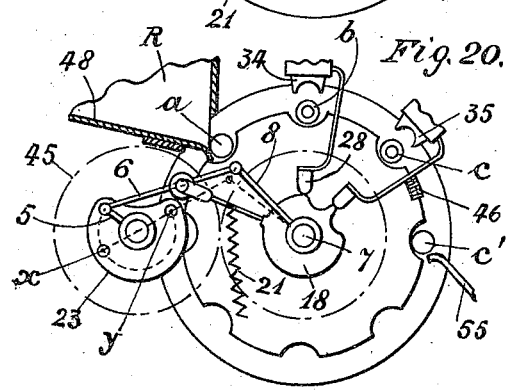

Situated at the points designated by I and II in Fig. 4, and in line with the two straw-tubes assumed to lie in the correspondingly located grooves 14, are the aforesaid slitting-tool and the spreading-out cone, both these instruments being actuated by similar devices, Figs. 6 and 7. The slitting-tool 37 and the spreading-out cone 38, each adapted to be replaced, are mounted at one end of spindles 39 which are made slidable in bearings 40 in the direction of the straw-tube located in the drum. The other and fork-shaped end of each of these spindles carries a roller 41, while springs 42 fitted on the spindles and interposed between the bearings 40 and the fork-shaped ends of the spindles have the tendency to press the rollers 41 against a loose disc 43 on the shaft 7, Figs. 2, 3, 6 and 7. The disc 43 is made integral with a toothed wheel 44 and adapted to be rotated by means of a second toothed wheel 45 of equal size meshing with the former, the crank 5 and the shaft 4 rotating therefore in an opposite direction to but at the same speed as the disc 43 on the shaft 7. This disc has also formed thereon a slanting projection 46, Figs. 2, 3, 6, 7 and 17 to 20, which upon the rotation of said disc is made to move first of all below and past the roller 41 of the spindle carrying the slitting-tool 37, and subsequently past the roller 41 appertaining to the spindle carrying the spreading-out cone 38, Fig. 14. The projection 46 effects hereby an axial sliding movement of the spindles in the direction of the arrow $a$, Figs. 6 and 7, but after its passage the spindles, through the action of the springs 42, return to their former position. According to the construction shown, the slitting-tool, as in other and known designs, possesses a series of knives 52 mounted in star form on a suitable plate, these knives on the forward movement of the spindle slitting the straw-tube into a number of strips, Fig. 14. The cone 38, on the other hand, when moved forward causes the slit strips to be spread out.

Figs. 2, 3, 4, 15 and 16 illustrate the device for automatically moving the straw-tubes 36 into the grooves 14 of the drum 13. A receptacle R serves to receive the straw-tubes and is provided with a hinged bottom 48 adapted to swing up and down, its free and downwardly curved end 50 projecting somewhat beyond the inner wall 49 of the receptacle and maintaining the bottom 48 in the position shown in Fig. 15 by its contact with the cylindrical part of the drum. In such position the discharge port 51 formed at the base of the receptacle is shut off therefrom. When, however, during the rotation of the drum 13 in the direction of the arrow, Fig. 15, any groove 14 reaches the projecting end of the hinged bottom 50, the latter, owing to its own weight, falls down into the position shown in Fig. 16, one of the straw-tubes 36 stored in the receptacle rolling through the discharge port 51 into the groove. Upon further rotation of the drum 13 the bottom of the receptacle is raised again into the former position until the arrival of the next groove in the drum. An intermediate wall 53 mounted in the receptacle R is adapted to be adjusted in a left or right-hand direction, in such a way, that the distance of the said wall 53 from the outer wall 54 of the receptacle exactly corresponds with the length of the straw-tubes 36 to be slit. The disposition of the receptacle relative to the plate 15 and the drum 13 is moreover such, that the single straw-tubes are caused to be dropped straight into the grooves 14 and so that the ends of the tubes away from the slitting-tool are made to rest against the plate 15 acting as an abutment.

In order more clearly to explain the operation of the apparatus, reference is made to the diagrammatical views, Figs. 17 to 20. It is assumed that the several parts are in the position indicated in Fig. 17, in which the groove 14 on the left from the top of the drum has just received a straw-tube $a$ while the two preceding grooves, as a result of the previous rotation of the drum, contain straw-tubes $b$ and $c$ respectively. In this position the clamping jaws 34 and 35 appertaining to the rods 28 and 29 are situated opposite the tubes $b$ and $c$ but are kept out of contact therewith by the cams formed on the disc 18, these cams pressing the said rods outwardly. The cam 23, when rotated in the direction opposite to that of the clock-hand, and the correspondingly turning crank 5 on the shaft 4, owing to the link 6 impart a swinging movement to the left of the lever-arm 8 on the shaft 7, while the toothed wheel 45 meshing with the toothed wheel 44 effects a rotary movement of the disc 43 in the direction of the clock-hand. Now, as soon as the depression in the cam 23 is brought opposite the roller 22 of the angle-shaped arm 20, the latter, by the action of the spring at 21, is gradually swinging downwards thereby causing a turning movement of the cam-disc 18 until the depressions 24 and 25 therein are located below the roller-supporting rods 28 and 29. These rods, controlled by the springs 30, descend into the said depressions and thus bring the clamping jaws 34 and 35 in contact with the straw-tubes $b$ and $c$ which they now securely hold within the grooves. The clamping of the tubes $b$ and $c$ lasts until the slitting process and the spreading out of the slit strips of the tubes has been completed. A continued rotation of the shaft 4 then results in the sliding movement, by means of the projection 46 on the rotating disc 43, of the spindle 39 carrying the slitting-tool 37 in the direction of the arrow $a$, Figs. 6 and 7, the knives 52 slitting the corresponding end of the straw-tube into a number of strips. Immediately after the release by the projection 46 of the spindle carrying the slitting-tool, the latter is withdrawn from the straw-tube $b$ by the action of the spring 42. The projection 46 has meantime reached close to the straw-tube $c$ of which, it is assumed, the end has already been slit in the manner described. The clamping jaws 34 and 35 are hereby still in the lower, that is, clamping position, Fig. 19. During the passage of the projection 46 past the roller of the spindle carrying the cone 38 the latter is caused to be moved towards the straw-tube and into its previously slit strips, thereby spreading out the same. Directly after the projection 46 has passed the roller of the cone-supporting spindle, the cone is withdrawn from the spread-out strips of the straw-tube and the parts of the mechanism assume the position indicated in Fig. 20. Thus, the cam 23 has against the action of the spring 21 once more lifted the arm 20 and thereby effected a rotary movement of the disc 18 in the direction of the clock-hand. The said disc and with it the rods 28 and 29 have consequently been returned to their initial positions and the clamping jaws 34 and 35 disengaged from the finished straw-tube mouthpieces *b* and *c*. When the stud of the crank 5 has arrived at the point *x*, Fig. 20, the swinging movement of the lever-arm 8 in a left-hand direction ceases and changes into a return swinging movement to the right. This return movement is lasting until the crank-stud has reached the position indicated at *y*. During such movement the shaft 7 is turned by the lever-arm 8 in the direction of the clock-hand and causes a turning of the drum 13 on the shaft 7 about an angle of exactly 45° so that the straw-tube *a* is brought to the position previously occupied by the straw-tube *b*. This tube *b*, in turn, is brought to the position formerly occupied by the tube *c*, and the latter to that of the tube *c'* from which position it is automatically discharged from the drum onto and down a slide-way 55 or other suitable device. When the crank-stud has once more reached the point *y*, the parts of the mechanism re-assume the positions according to Fig. 17, the whole action described then being repeated.

Having now fully described my said invention what I claim and desire to secure by Letters Patent is:—

1. In the herein-described apparatus for preparing cigarette mouthpieces in the form of straw tubes, the combination, of a cylindrical holder having a series of laterally disposed grooves on its circumference adapted to receive the straw-tubes, mechanism to cause an intermittent rotation of the holder, means for holding at least two neighbouring straw-tubes within the grooves after each intermittent movement of the holder and means to release the said tubes therefrom, a slitting-tool mounted in line with one of the straw-tubes when secured in its groove, a cone mounted in line with the straw-tube fixed in the neighbouring groove, means to cause a sliding movement of the slitting-tool and the cone towards and into the one end of the two aforesaid straw-tubes, and means for subsequently retracting the slitting-tool and the cone, all as and for the purpose set forth.

2. In the herein-described apparatus for preparing cigarette mouthpieces in the form of straw tubes, the combination, with a drum having a series of laterally disposed and equidistant grooves on its circumference adapted to receive the straw-tubes, of mechanism to cause an intermittent rotation of the drum, means to discharge a straw-tube into one groove after every intermittent rotation of the drum, means for holding the two preceding straw-tubes within their grooves and means to release them therefrom, a slitting-tool and a spreading-out cone mounted axially of and in line with the securely held two straw-tubes respectively, means to cause a sliding movement of the said slitting-tool and cone towards and into the fixed tubes, and means for subsequently retracting the slitting-tool and cone, as and for the purpose set forth.

Kommerzienrat LUDWIG PRZEDECKI.